Jan. 1, 1929.

W. J. ANDRES 1,697,219

BRAKE OPERATING MEANS

Filed Oct. 30, 1926

INVENTOR
WILLIAM J. ANDRES
BY
*M. W. McConkey*
ATTORNEY

Patented Jan. 1, 1929.

1,697,219

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MEANS.

Application filed October 30, 1926. Serial No. 145,148.

This invention relates to brakes, and is illustrated as embodied in novel operative means for automobile brakes.

An object of the invention is to utilize yielding means, such as a rubber bushing, to support the brake-applying shaft in such a manner as to permit the shaft to shift crosswise sufficiently to center the brake-applying device automatically, thus compensating for slight differences in wear or in adjustment of different parts of the brake. Preferably the bushing or its equivalent is bonded or otherwise secured, for example by vulcanization, to the shaft, so that it also serves, like a return spring, to resist angular brake-applying movement of the shaft. This also obviates the need of lubricating the shaft bearing.

In one very desirable arrangement, I minimize the cost of a shaft support of this character by making it of two complementary stampings held together, at least in part, by the above-described bushing or its equivalent. Preferably the stampings are drawn out to form bosses or half-sleeves enclosing and, if desired, bonded to the bushing, and there may also be similar sets of half-sleeves for the attaching bolts for the bracket.

The above and other objects and features of the invention, including various novel combinations of parts and desirable particular constructions, will be apparent from the following description of the illustrative embodiments shown in the accompanying drawing, in which.

Figure 1:
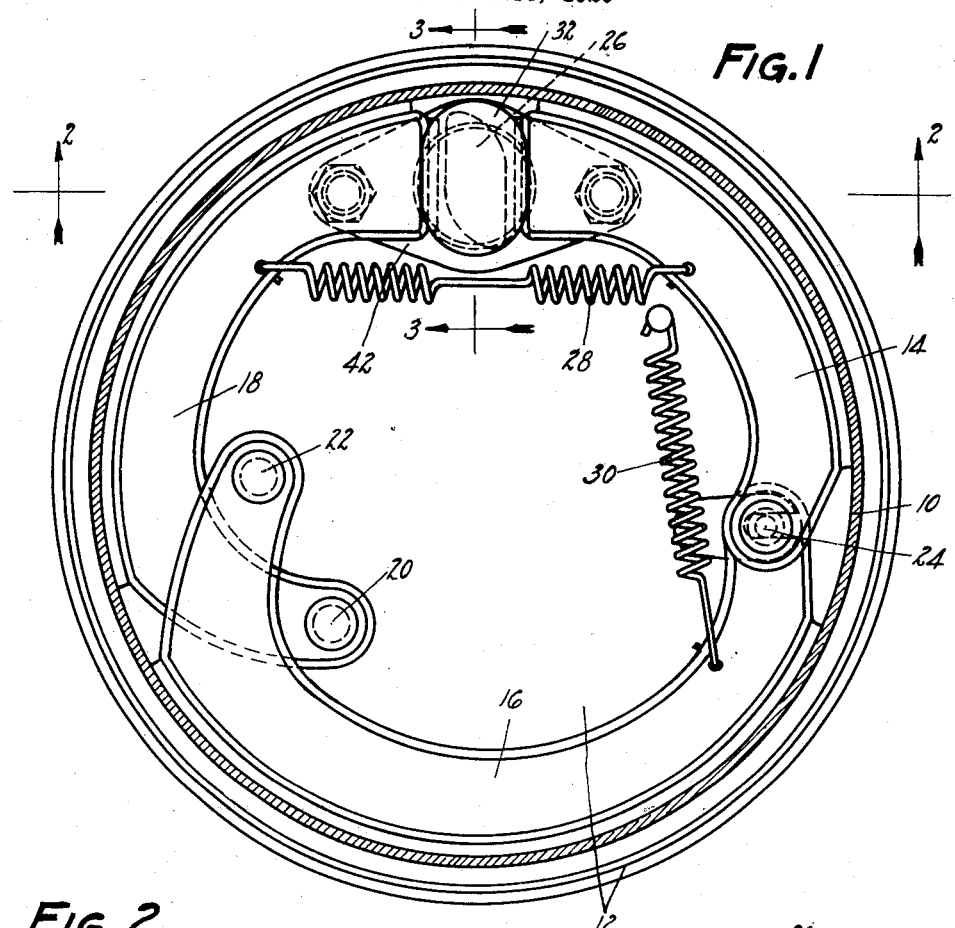
Figure 1 is a vertical section through a brake embodying the invention, just inside the head of the brake drum, showing the brake shoes in side elevation.

The brake of Figure 1 includes a rotatable drum 10, at the open side of which is a stationary support such as a backing plate 12. Within the drum are arranged three brake shoes 14, 16, and 18, shoe 18 being anchored on a pivot 20, shoe 16 being anchored on a pivot 22, and shoe 14 being connected to shoe 16 by a floating pivot 24. The brake is applied by means such as a double cam 26 against the resistance of a return spring 28, shoe 16 being applied by shoe 14 against the resistance of an auxiliary return spring 30. Cam 26 may have an end flange 32 confining the shoe ends laterally.

Figure 2:
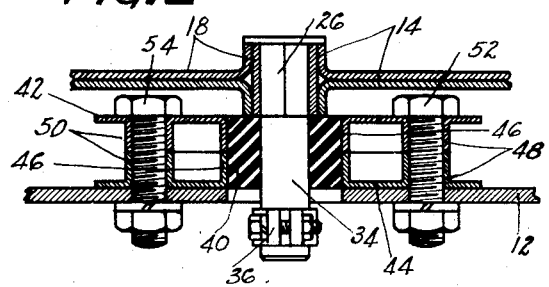
Figure 2 is a section, on the line 2—2 of Figure 1, showing the novel stamped bracket and the mounting of the rubber bushing.
Figure 3:
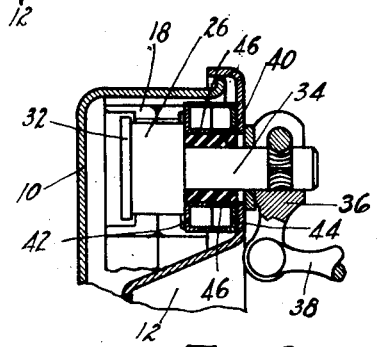
Figure 3 is a section on the line 3—3 of Figure 1, showing the operating means of the brake.

The present invention relates to novel means provided for supporting a shaft 34 operating the cam 26, or an equivalent brake-applying device, and illustrated in Figures 2 and 3 as integral with the cam. Shaft 34 may have an operating arm 36 clamped on its inner end and operatively engaged by the end of a substantially horizontal brake-operating lever 38 fulcrumed on the axle (not shown); the joint between lever 38 and arm 36 being arranged, when the brake is applied, above and substantially in line with the king-pin of the wheel (not shown).

According to an important feature of the invention, the shaft is yieldingly supported, for example by a sponge rubber bushing 40 which is preferably vulcanized or otherwise bonded internally to shaft 34 and externally to a supporting bracket. The bushing, when so bonded to the shaft and its bracket, has three principal functions: (1) it can yield sufficiently to permit the cam 26 and shaft 34 to shift crosswise of the shaft (i. e. along a chord of drum 10), to equalize the brake-applying pressures on shoes 14 and 18, thus compensating for unequal wear or incorrect adjustment; (2) it acts as an auxiliary return spring in resisting brake-applying angular movement of the shaft on account of the torsional distortion of the rubber; and (3) it obviates all need of lubricating shaft 34.

The bracket which carries the bushing 40, in the arrangement of Figures 2 and 3, embodies in itself substantial novelty, and is preferably built up of two complementary sheet-metal stampings 42 and 44. These stampings are shown with integrally-drawn bosses or half-sleeves 46 arranged edge to edge and embracing (and bonded to) the bushing 40, and preferably also with pairs of integrally drawn half-sleeves 48 and 50 for bolts 52 and 54 which serve to attach the bracket to the backing plate 12. During handling or shipment, before being attached by these bolts to the backing plate, the bushing 40 serves to hold the two stampings together.

While illustrative embodiments have been described in detail, it is not my intention to limit its scope to those particular embodiments, or otherwise than by the terms of the appended claims.

I claim:

1. A brake including retarding means and an operating device therefor, and comprising, in combination therewith, a shaft for operating said device, a support about said shaft, and a rubber bushing bonded to the support and to the shaft and having three functions, viz: (1) to urge the shaft angularly toward brake-released position; (2) to allow the shaft to shift across its axis to permit the device to center itself; and (3) to obviate any need for lubrication of the shaft.

2. A brake including retarding means and an operating device therefor, and comprising, in combination therewith, a shaft for operating said device, a support about said shaft, and a yielding bearing secured to the support and to the shaft and having three functions, viz: (1) to urge the shaft angularly toward brake-released position; (2) to allow the shaft to shift across its axis to permit the device to center itself; and (3) to obviate any need for lubrication of the shaft.

3. Brake-operating means including a brake-applying device and an operating shaft therefor, and comprising, in combination therewith, an elastic bearing secured to the shaft and resisting angular brake-applying movement of the shaft and at the same time yieldable to permit the shaft to shift across its axis so that the brake-applying device may center itself.

4. Brake-operating means including a brake-applying device and an operating shaft therefor, and comprising, in combination therewith, a rubber bushing secured to the shaft and resisting angular brake-applying movement of the shaft and at the same time yieldable to permit the shaft to shift across its axis so that the brake-applying device may center itself.

5. Brake-operating means including a brake-applying device and an operating shaft therefor, and comprising, in combination therewith, a support surrounding the shaft, and a rubber bushing in the support and sleeved on and supporting the shaft.

6. Brake-operating means including a brake-applying device and an operating shaft therefor, and comprising, in combination therewith, a support surrounding the shaft, and a yieldable bushing in the support and sleeved on and supporting the shaft.

7. Operating means comprising, in combination, a pair of complementary stampings having alined tubular integral bosses jointly forming a bearing sleeve, a shaft substantially smaller in diameter than the sleeve and passing through the sleeve, and a yielding bushing externally bonded to said two alined bosses and internally bonded to the shaft.

8. Operating means comprising, in combination, a pair of complementary stampings having alined tubular integral bosses jointly forming a bearing sleeve, and a yielding bushing externally bonded to said two alined bosses and formed with a central shaft opening.

9. Operating means comprising, in combination, two complementary stampings having alined openings, and a single rubber bushing secured in said openings and holding the stampings secured together during shipment.

10. Operating means comprising, in combination, two complementary stampings having at its opposite ends alined bolt openings and having at its center alined shaft openings, and a single rubber bushing secured in said shaft openings and holding the stampings secured together during shipment.

11. Operating means comprising, in combination, two complementary stampings having at its opposite ends alined bolt openings and having at its center alined shaft openings, and a single rubber bushing secured in said shaft openings and holding the stampings secured together during shipment, the metal about each pair of alined openings being drawn out to form half-sleeves arranged facing each other edge to edge.

12. Operating means comprising, in combination, two complementary stampings having at its opposite ends alined bolt openings and having at its center alined shaft openings, and a single rubber bushing secured in said shaft openings and holding the stampings secured together during shipment, the metal about each pair of alined openings being drawn out to form half-sleeves arranged facing each other edge to edge, the half-sleeves about the shaft openings being bonded to the outside of the bushing.

In testimony whereof, I have hereunto signed my name.

WILLIAM J. ANDRES.